United States Patent [19]

Wightman et al.

[11] 4,305,533

[45] Dec. 15, 1981

[54] VEHICULAR CUP AND BASE ASSEMBLY

[76] Inventors: John W. Wightman, 906 W. Roxbury, Schaumburg, Ill. 60194; Lawrance W. Wightman, 3 Ridgecreek, St. Louis, Mo. 63141

[21] Appl. No.: 109,817

[22] Filed: Jan. 7, 1980

[51] Int. Cl.³ .................... B60R 7/00; B65D 25/24
[52] U.S. Cl. ........................... 224/42.42; 219/430; 219/432; 219/433; 220/69; 220/85 H; 220/90.4; 248/311.2; 248/346
[58] Field of Search ............... 220/69, 85 H, 85 K, 220/90.4; 224/273, 311, 42.45 R, 42.42; 248/346.1, 216.1, 274, 311.2, 310, 154, 346

[56] References Cited
U.S. PATENT DOCUMENTS

| | | | |
|---|---|---|---|
| 752,250 | 2/1904 | Norman | 220/69 |
| 1,576,139 | 3/1926 | Schneider | 220/69 |
| 2,678,127 | 5/1954 | Sinko | 224/273 |
| 3,278,148 | 10/1966 | Denaro | 248/312.1 X |
| 3,357,614 | 12/1967 | Berg | 224/273 |
| 3,357,669 | 12/1967 | D'Amato | 248/346.1 |
| 3,482,809 | 12/1969 | McCall, Jr. | 248/346 X |
| 3,624,788 | 11/1971 | McMahon | 220/85 H X |
| 3,794,285 | 2/1974 | Barts | 248/311.2 |
| 3,990,654 | 11/1976 | Michael | 248/311.2 |
| 4,127,211 | 11/1978 | Zerbey | 220/69 X |

Primary Examiner—Allan N. Shoap
Attorney, Agent, or Firm—Polster, Polster and Lucchesi

[57] ABSTRACT

A cup and base assembly for use in vehicles includes a cup, with a loop handle, and a separate base, circular in plan at its lower edge. A triangulate plate is attached to the bottom of the base. The plate has ears projecting beyond the periphery of the base, and a handle-engaging crook with a stem integral with the plate and a finger extending laterally from the stem and positioned to extend within the loop handle. A sloshing inhibitor has a central imperforate disc of material capable of a permanent set, and, integral with the disc, straps bent upwardly on a radius from the edge of the disc, so that the radius serves to space the disc from the inside surface of the cup. Ears, integral with the straps, are bent outwardly at the upper end of the straps, for engaging the upper lip of the cup.

2 Claims, 6 Drawing Figures

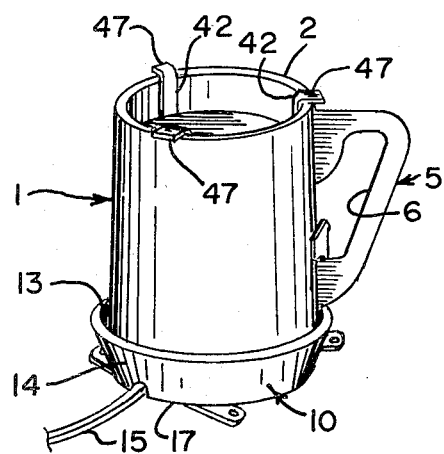
FIG. 1.
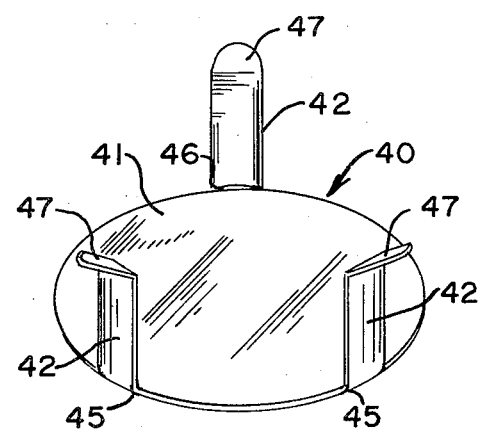
FIG. 5.
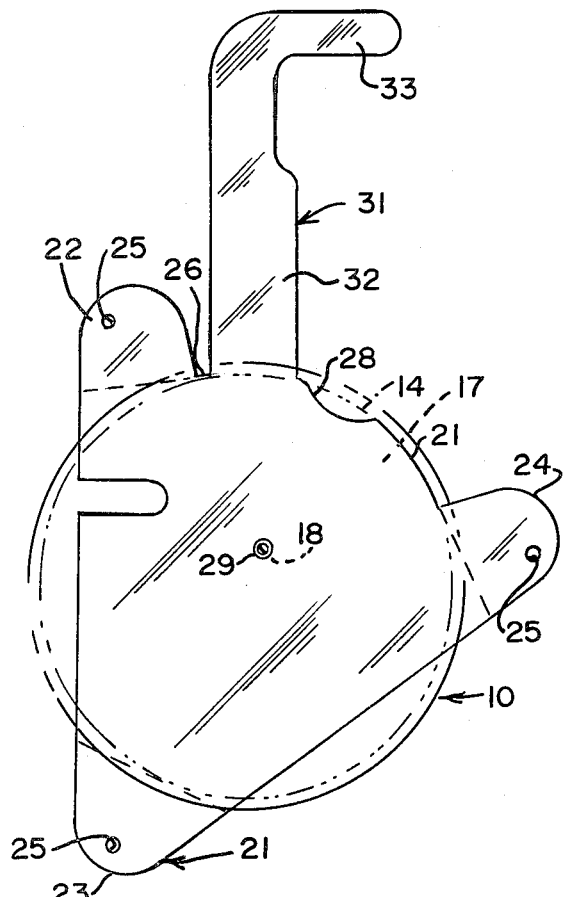
FIG. 2.
FIG. 3.
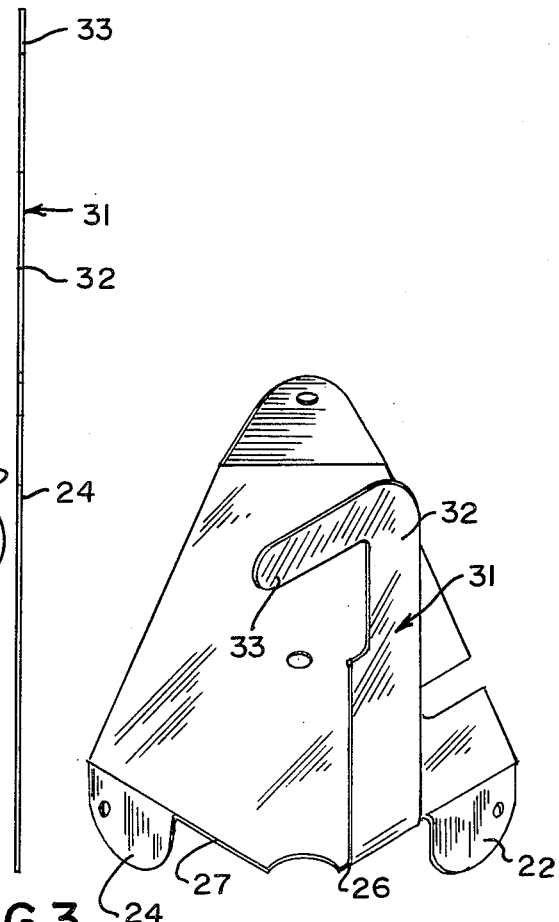
FIG. 6.
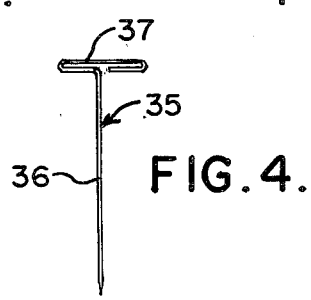
FIG. 4.

4,305,533

VEHICULAR CUP AND BASE ASSEMBLY

BACKGROUND OF THE INVENTION

It is common practice to have holders for cups or cans in trucks and automobiles. It is an object of the present invention to provide a means for keeping the contents of a cup desirably hot, and to provide a simple, effective and inexpensive means for avoiding spillage of the liquid that is being kept hot.

U.S. Pat. Nos. 3,876,861 and 4,160,152 illustrate devices in which a self-regulating heating unit is mounted in a base and a cup, especially designed to utilize heat from the base, is designed to fit the base. Such a base can be adapted to operate from a 12 volt battery in an automobile or truck. The present invention is directed to providing means for mounting the base in a vehicle and for inhibiting sloshing.

SUMMARY OF THE INVENTION

In accordance with this invention, generally stated, in a cup and base assembly for use in vehicles, a triangulate plate is attached to the bottom of the base. The plate has ears projecting beyond the periphery of the base and a handle-engaging crook having a stem integral with the plate and a finger, extending laterally from the stem, positioned to extend within the loop of the cup handle. The ears can be kept in the plane of the plate, and provided with double-faced tape or the like for adherence to a flat surface, or they may be bent downwardly slightly to define a plane through their three points of contact to provide a stable support on somewhat irregular surfaces. The ears also have pin-admitting holes in them and are adapted to be bent manually to conform to the contour of an arcuate hump, when the base is to be mounted on the hump of an automobile with pins to hold them to the hump-covering mat. The sloshing inhibitor has a central, imperforate disc of permanently deformable material, and, integral with the disc, straps bent upwardly from the central disc on a radius from the edge of the disc. The radius serves to space the disc from the inside surface of the cup. At their free ends, the straps have ears, bent outwardly, engaging the upper lip of the cup.

BRIEF DESCRIPTION OF THE DRAWING

In the drawing,

FIG. 1 is a view in perspective of one embodiment of cup and base assembly of this invention;

FIG. 2 is a top plan view of the mounting plate with parts of the base shown in dotted lines, before the stem of the handle-engaging crook is bent;

FIG. 3 is a view in edge elevation of the plate shown in FIG. 2;

FIG. 4 is a view in elevation of a pin suitable for fastening the plate to a hump mat;

FIG. 5 is a view in perspective showing one embodiment of slosh inhibitor; and

FIG. 6 is a view in perspective of a plate with ears bent down and the stem of the handle-engaging crook bent up.

DESCRIPTION OF THE PREFERRED EMBODIMENT

Referring now to the drawing for one illustrative embodiment of assembly of this invention, reference numeral 1 indicates a cup with a lip 2 and a loop handle 5, an inside surface 6 of which defines an opening for the fingers of the user.

In its warming and normal rest position, the cup rests on a platform 13 of a base-warmer 10, encircled by a side wall 14. An electrical conductor cord 15, equipped with a suitable electrical fitting, not here shown, is plugged into the cigarette lighter socket or some other suitable connection to a vehicle battery. The base 10 has a bottom wall 17 through the outer surface of which a screw hole 18 extends. The base bottom is circular in plan, and the screw hole, and an interior boss, not shown, to receive a mounting screw, are eccentrically positioned with respect to the radial center of the base.

A mounting plate 21 is triangulate, i.e., of a general triangular shape, with ears 22, 23, and 24. The edge between ears 22 and 23 and between ears 23 and 24 is straight. The edge between ears 22 and 24 is made up of three parts, an edge 26 substantially perpendicular to the edge between ears 22 and 23, an edge 27, substantially perpendicular to the edge between ears 23 and 24, and an intermediate indentation 28 between the edges 26 and 27. Pin-receiving holes 25 extend through ears 22, 23 and 24. Lines drawn between holes 25 would define an isosceles triangle, the line between the holes 25 in ears 22 and 24 being slightly shorter than the lines between the holes 25 in the ears 22 and 23 and 23 and 24. A screw hole 29 through the plate, is positioned to coincide with the screw hole 18 in the base bottom when the plate is properly positioned on the base.

A crook 31 has a stem 32, integral with the rest of the plate 21 along the edge 26, and a finger 33.

T-shaped pins 35, each with a pointed shank 36 and a cross bar head 37, are sized to permit the shank to pass through the holes 25, 26 and 27 and the cross bar to engage the upper surface of the ears.

Referring now to FIGS. 1 and 5, a sloshing inhibitor 40 has a central imperforate disc 41, and straps 42, integral with the disc 41. The straps are bent up from the edge of the disc from which they project radially initially, on a radius 45, which provides an offset 46 radially of the disc. At their upper ends, the straps 42 are bent out to form ears 47 for engaging the lip 2 of the cup, as shown in FIG. 1.

The plate 21 is mounted on the bottom wall of the base 10 by means of an ordinary self-tapping screw, extending through the hole 29 in the plate into the hole 18 and its backing boss. It is evident from FIG. 2 that the edges 27 and 26 are, when the plate is properly positioned, substantially tangent to the lowermost edge of the base 10. In this position, the stem 32 is in a position to be bent upwardly around the base to project above the base. In this condition, the finger 33 is at a height to receive the inner surface at the lower edge of the opening in the handle 5 of a cup resting on the platform 13. If desired, the finger 33 can be bent to conform to the external contour of the cup.

The sloshing inhibitor 40 is, like the plate 21, initially blanked out from flat stock of material that has some resilience but that can be permanently deformed. The straps 42 are, as has been indicated, bent on a radius sufficient to provide clearance between the edge of the disc 41 and the inside surface of the cup. The ears 47 are bent out at whatever height is desired to permit filling to the chosen level immediately below the disc. Preferably, the inside surface of the cup flares outwardly downwardly slightly, but in any event, if the straps 42 are bent to a slightly radially outward inclination toward their upper ends, they will snap into the cup and the inherent springiness of the straps will provide a secure mounting, while permitting the device to be removed manually for cleaning.

In mounting the base on a hump, as has been indicated, the ears 22, 23 and 24 can be bent to accommodate the arch of the hump. An extreme example is shown in FIG. 6. Ordinarily, the bend is likely to be considerably less than 90°, and is likely to differ from ear to ear. In any case, when the ears are in the proper position, the pins 35 are inserted through the holes 25 into the mat. In the case of a console, although the device is stable, it may be desirable to put a piece of tape or the like across one or more of the ears, or double-faced tape under them.

Numerous variations in the construction of the device of the invention, within the scope of the appended claims, will occur to those skilled in the art in the light of the foregoing disclosure. Merely by way of example, and not of limitation, the shape of the plate 21 and the ears can be varied, as can the shape of the disc 41. The number and location of the straps 42 can be varied. These are merely illustrative.

Having thus described the invention, what is claimed and desired to be secured by Letters Patent is:

1. In a cup and base assembly for use in vehicles, said assembly including a cylindrical cup with a loop handle immediately adjacent the top of one of said arms, and a separate support base having a bottom and a side wall, circular in plan at a lower edge thereof, the improvement comprising a triangulate plate attached to the bottom of said base, said plate having ears projecting beyond the periphery of said lower edge of said base, and a handle-engaging crook having a stem integral with said plate and projecting substantially perpendicularly thereto and above said side wall, and a finger, extending laterally from said stem in a direction generally tangent to said cup and perpendicular to said stem, and positioned to extend within said loop handle having two axially spaced arms extending from the exterior side wall of said cup radially outward with a holding part therebetween connecting said arms.

2. The improvement of claim 1 wherein the said ears have pin-admitting holes in them and are adapted to be bent downwardly manually to conform to the contour of an arcuate hump of a vehicle floor.

* * * * *

UNITED STATES PATENT AND TRADEMARK OFFICE
CERTIFICATE OF CORRECTION

PATENT NO. : 4,305,533
DATED : December 15, 1981
INVENTOR(S) : John W. Wightman et al.

It is certified that error appears in the above—identified patent and that said Letters Patent is hereby corrected as shown below:

Cancel claim 1 and substitute therefor:

1. In a cup and base assembly for use in vehicles, said assembly including a cylindrical cup with a loop handle having two axially spaced arms extending from the exterior side wall of said cup radially outward with a holding part therebetween connecting said arms, and a separate support base having a bottom and a side wall, circular in plan at a lower edge thereof, the improvement comprising a triangulate plate attached to the bottom of said base, said plate having ears projecting beyond the periphery of said lower edge of said base, and a handle-engaging crook having a stem integral with said plate and projecting substantially perpendicularly thereto and above said side wall, and a finger, extending laterally from said stem in a direction generally tangent to said cup and perpendicular to said stem, and positioned to extend within said loop handle immediately adjacent the top of one of said arms.

Signed and Sealed this

Sixteenth Day of March 1982

[SEAL]

Attest:

Attesting Officer

GERALD J. MOSSINGHOFF
Commissioner of Patents and Trademarks